United States Patent [19]
Hayes

[11] Patent Number: 5,718,113
[45] Date of Patent: Feb. 17, 1998

[54] FUEL STRIP

[76] Inventor: Michael D. Hayes, 14 Parman Pl., San Antonio, Tex. 78230

[21] Appl. No.: 718,597

[22] Filed: Sep. 23, 1996

Related U.S. Application Data

[63] Continuation-in-part of Ser. No. 365,499, Dec. 28, 1994, abandoned.

[51] Int. Cl.$^6$ ..................................................... F02K 9/28
[52] U.S. Cl. ............................... 60/251; 60/253; 60/257; 60/260
[58] Field of Search ............................. 60/250, 251, 253, 60/254, 257, 260, 723; 102/374

[56] References Cited

U.S. PATENT DOCUMENTS

| | | | |
|---|---|---|---|
| 3,044,252 | 7/1962 | Zwicky | 60/221 |
| 3,166,898 | 1/1965 | Hoeptner | 60/251 |
| 3,289,412 | 12/1966 | Iwanciow | 60/251 |
| 3,388,554 | 6/1968 | Hodgson | 60/252 |
| 3,420,061 | 1/1969 | Schaeffer | 60/267 |
| 3,479,818 | 11/1969 | Strobl | 60/39.48 |
| 3,553,964 | 1/1971 | Kircher, III | 60/39.14 |
| 3,613,375 | 10/1971 | Abild | 60/240 |
| 3,812,671 | 5/1974 | Burr et al. | 60/39.47 |
| 5,099,645 | 3/1992 | Schuler et al. | 60/219 |
| 5,101,623 | 4/1992 | Briley | 60/251 |
| 5,109,666 | 5/1992 | Eickmann | 60/39.464 |
| 5,127,223 | 7/1992 | Hightower, Jr. et al. | 60/253 |
| 5,175,022 | 12/1992 | Stout et al. | 427/561 |
| 5,224,663 | 7/1993 | Criswell | 244/1 R |
| 5,339,625 | 8/1994 | McKinney et al. | 60/251 |

OTHER PUBLICATIONS

Table I Experimental hybrid combustion studies; *Hetrogeneous Combustion*; Edited by Wolfhard, Glassman, and Green Jr.; pp. 476, 477; Academic Press; New York/London 1964.

*The Chemistry of Propellants*; Agard Combustion and Propulsion Panel, Paris France; Jun. 8–12, 1959; Penner and Ducarme, Ed.; pp. 378, 379; Pergamon Press; Oxford et al.; 1960.

*A Solid–Liquid Rocket Propellant System*; Moore and Berman; Jet Propulsion, Nov. 1956; pp. 965–968.

*Primary Examiner*—Charles G. Freay
*Attorney, Agent, or Firm*—Jenkens & Gilchrist

[57] ABSTRACT

A fuel member comprises a continuous, elongated, flexible and combustible structural component that has a length to width of ratio greater than 100:1, and contains within the structural component, either as a part thereof or as a separate component, an oxidizer in an amount sufficient to support combustion of the fuel member. The fuel member is essentially self-supporting in that it does not require containment tanks or rigid encasement, and therefore is particularly suitable for use in single stage, reusable rocket propulsion systems.

18 Claims, 5 Drawing Sheets

FUEL STRIP

This application is a continuation-in-part of application Ser. No. 08/365,499 filed Dec. 28, 1994, now abandoned.

TECHNICAL FIELD

This invention relates generally to an elongated fuel member and more particularly to such a fuel member having an oxidizer for the fuel contained within the member.

BACKGROUND ART

Fuel systems containing both the actual fuel and an oxidizer to support combustion of the fuel are used for propelling rockets and missiles, and for providing a high temperature environment void of air and its associated products of combustion, such as in the controlled atmosphere heat treatment of certain metals and other materials. Such fuel systems can generally be categorized into three basic types: all-liquid, all-solid, and a combination of solid and liquids often referred to as hybrid systems.

Liquid-fueled rockets typically use liquefied oxygen, or LOX, as the oxidizer for a liquid fuel such as kerosene, ethyl alcohol, or liquified hydrogen. Unfortunately, liquified oxygen has a very low boiling point and therefore evaporates quickly. Once transferred into an on-board pressure container, liquid oxygen must be vented to avoid over pressurization, and either used or transferred back to storage tanks within a relatively short time. In addition to the storage problems associated with all-liquid fuel systems, the on board fuel and oxidizer containment tankage adds significantly to the mass that must be lifted and propelled.

Solid fuel systems also require encasement in a structure that adds significantly to the takeoff mass a vehicle and additionally is generally difficult to burn, or combust, at a selectively controlled rate.

Similarly hybrid systems that use a combination of liquid and solid fuels or oxidizers require storage tanks and/or encasement structures which increase the amount of weight that must be lifted at takeoff.

The weight required for fuel storage or containment structures significantly reduces the mass ratio of a rocket propelled vehicle. The term "mass ratio" as commonly understood, is defined by the equation:

$$\text{Mass Ratio} = M_0/M_1;$$

where, $M_0$ is the take-off mass, often referred to as the gross take off weight (GTOW) and includes the mass of the fuel ($M_F$), the mass of the rocket structure ($M_s$), and the mass of the payload ($M_p$), and $M_1$ is the mass remaining after expenditure of fuel consumed. Generally, $M_1 = M_s + M_p$ if all of the fuel is consumed.

Thus, it can be seen that if the mass remaining $M_1$ can be reduced with respect to the take-off mass $M_0$, the mass ratio will have a higher value. Furthermore, it has been shown that a rocket's velocity is equal to the gas exhaust velocity times the natural logarithm of the mass ratio. That is:

$$\text{Final velocity} = \text{Gas Exhaust Velocity} \times \ln(\text{Mass Ratio}).$$

Corrective factors are added to the equation to compensate for the effects of air drag and gravitational fields which may affect the final velocity. In any case, given the same gas exhaust velocity, a higher mass ratio means that a vehicle can be propelled to a higher altitude, accelerated to a higher velocity, and cover more distance than a vehicle producing the same thrust (gas exhaust velocity) but having a lower mass ratio.

Heretofore, due to the fuel support structures required to be carried on board a propulsion vehicle, it has not been possible to construct single stage rockets for which the mass ratio and gas velocity combined in the above equation allow the vehicle to reach low earth orbit (LEO). For that purpose, including corrective for air drag and the effect of gravity, about 30,000 feet per second total velocity is required. Thus, multiple stage rockets have heretofore been required for earth orbit and space applications.

Typically, fuel and oxidizer tanks along with their associated structure may constitute about 4% of the GTOW of modern vehicles for space applications. More importantly, they may constitute 50% or more of the mass remaining after consumption of the fuel. The effect of this dead weight fraction on the final velocity attained is proportional to the integral of the changing mass ratio over the period of time that thrust is produced by the engine. The final velocity attained is particularly sensitive to the thrust to weight in the last fraction of the thrust run due to the last fraction of fuel being used largely to impart momentum to empty tanks and overhead structure.

The present invention is directed to overcoming the problems set forth above. It is desirable not to carry heavy tank structures on a vehicle. It is also desirable to have reactants in a form that can be stored on board a vehicle for relatively long periods prior to launch. Furthermore, it is desirable to have a fuel system in which reactants may be delivered to the rocket engine at a selectively controllable rate, whether they be in liquid or solid form.

DISCLOSURE OF THE INVENTION

In accordance with one aspect of the present invention, a fuel member has a continuous, elongated, flexible and combustible structural component that has a length to width ratio of at least 100:1, and an oxidizer contained within the structural component in an amount sufficient to support substantially complete combustion of the fuel member.

Other features of the fuel member embodying the present invention include the fuel member having a tubular wall structure that defines a plurality of separate cavities arranged along a longitudinal axis of the member. The cavities contain oxidizer or monopropellant components of the fuel member.

Yet another feature of the fuel member embodying the present invention includes the structural member having a substantially uniform, unitary structure that comprises a solid mixture of fuel and oxidizer.

In accordance with another aspect of the present invention, a fuel member has a continuous, elongated, substantially rigid combustible structural component and a liquid oxidizer contained within the structural component in an amount sufficient to support the combustion of a predetermined portion of the combustible structural component.

BEST MODE FOR CARRYING OUT THE INVENTION

This invention is directed to a fuel form which is self supporting and does not require on board tankage or encasement structures. Without such nonconsumable impediments, the mass ratio of the vehicle can be increased. The fuel form embodying the present invention comprises an elongated strip, similar to a hose, that is both flexible and combustible. In one embodiment, the fuel strip consists of a solid fuel and oxidizer embedded in a plastic or synthetic rubber base, similar to the fuels used in solid fuel rockets. However, in carrying out the present invention, instead of being molded, or cast, into the case of a rocket engine, the solid fuel is extruded into a long self-supporting fuel strip. In another embodiment, separate liquid fuel and oxidizer components are disposed in separate chambers within the fuel strip.

The fuel strip embodying the present invention may include the following fuel types:

1. A solid fuel intermixed with a solid oxidizer,
2. A solid fuel with a liquid oxidizer that is retained in either a single or a plurality of separated chambers along the length of the fuel strip,
3. A liquid fuel and a liquid oxidizer, in which each are held in separated chambers with respect to each other along the same fuel strip, or in separate strips.

Figures 1, 2:
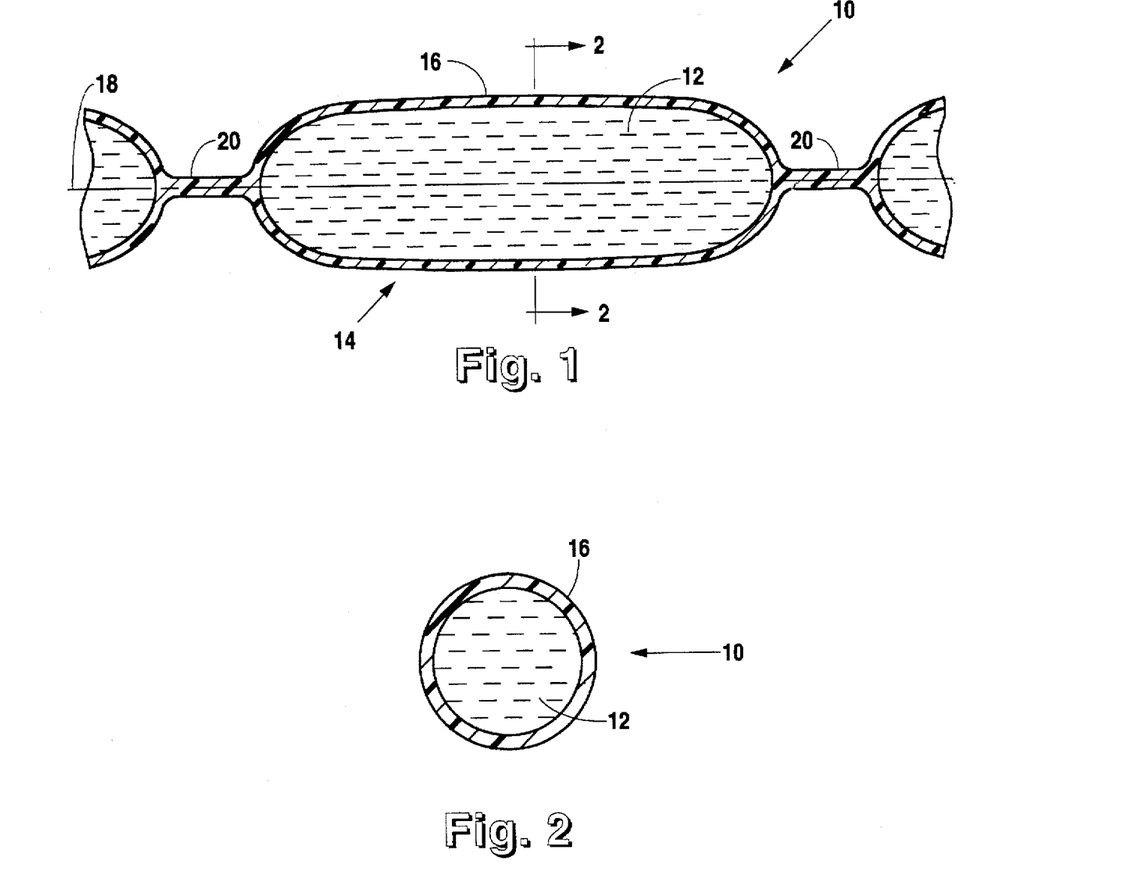
FIG. 1 is longitudinal sectional view of a fuel strip embodying the present invention.
FIG. 2 is a cross-sectional view of the fuel strip taken along the line 2—2 in FIG. 1.

In the preferred embodiment of the present invention, a fuel strip 10 has a liquid oxidizer 12 encapsulated within separate segments 14 of a tubular solid fuel component 16. Encapsulation of the liquid oxidizer 12 into separate chambers, or segments 14 avoids the problems associated with internal pressure differential within the fuel strip 10 when it is coiled into a spool shape having a significant height. Preferably, the oxidizer is hydrogen peroxide ($H_2O_2$) which, after catalytic reaction, is not only a monopropellant but also provides free oxygen to support combustion of another fuel. Hydrogen peroxide has none of the problems associated with cryogenic fuel transfer, pressurization, and storage, is storable over reasonable lengths of time, and is not environmentally disadvantageous. Upon disassociation to gases by a catalyst, 90% pure $H_2O_2$ provides over 42%, by weight, free oxygen and 98% pure $H_2O_2$ provides almost 47% free oxygen. Furthermore, hydrogen peroxide can, and indeed has been, used in hybrid rocket systems in conjunction with a variety of solid fuels.

In the preferred embodiment of the present invention, polyethylene is used to form the continuous, elongated, flexible and combustible structural component 16 of the fuel strip 10. Polyethylene is normally nonreactive with $H_2O_2$ and is often used as a shipping container for hydrogen peroxide. Also, the combustion of polyethylene with hydrogen peroxide produces an energy about equal to that achieved by the combustion of jet fuel with hydrogen peroxide. In the preferred embodiment, a commercial grade intermediate density polyethylene suitable for the fuel component 16 has the following properties:

TABLE I

| Specific Gravity | 940 kg/m$^3$ |
| --- | --- |
| Crystallinity | 75% |
| Rigidity | #2 |
| Softening Temperature | 114° C. |
| Tensile Strength | 1485 kg/cm$^2$ |
| Elongation | 400% |
| Impact Strength | >10 |

In forming the polyethylene component of the fuel strip 10, the thermoplastic polyethylene material described above is heated and extruded in a conventional manner to form an elongated, essentially continuous tubular member having a centrally disposed longitudinal axis 18 extending along its length. After extrusion, predetermined amounts of hydrogen peroxide are injected into a vertically oriented portion of the tubular member, after which that section of the tube, i.e., a segment 14, is sealed by pressing the extruded tube between a pair of heated rollers, or plates, to form a sealed connecting link 20 between the segments 14. Desirably, the fluid is injected through the wall of the tubular member at a position within the area to be subsequently pressed to form the connecting link 20, thus also sealing the injection opening.

The thickness of the extruded tube must be sufficient to provide adequate structural integrity to support stacked coils of the fuel strip 10 during acceleration and dynamic loading. Also, in determining the relative size and wall thickness of the segments 14, it is important that sufficient oxidizer be available to support the complete combustion of the fuel component. However, it is important to note that if atmospheric air is available to assist fuel combustion, e.g., ram air directed to the engine for a short time following launch, the construction of an appropriate section of the fuel strip 10 may easily be varied to provide a leaner oxygen to fuel ratio.

In the preferred embodiment, polyethylene fuel using hydrogen peroxide as the primary oxygen source, requires about a 1:7 weight ratio of fuel to oxidizer. Ninety-eight percent Hydrogen peroxide has a specific gravity of 1514 kg/m$^3$, and the polyethylene fuel component, as indicated above, has a specific gravity of 940 kg/m$^3$. Below, in TABLE II, specific dimensions are listed for construction of the fuel strip 10 illustrated in FIGS. 1 and 2 in which the fuel and oxidizer materials of the preferred embodiment are present in a ratio of 1:7. The length of each segment 14 is three times the diameter of the segment, and each of the connecting links 20 is one/half the segment diameter. The stated wall thicknesses are sufficient to support a coiled spool of the fuel strip 10 having a height of 4.88 m (16 ft) under a maximum acceleration of 3 g, that lift off thrust is equal to 1.3 times the vehicle mass and that maximum structural loading and internal pressures on the spool will be reached when slightly over half (56%) of the spool is depleted. This point occurs about two minutes after launch and creates a pressure at the bottom of the spool, aligned axially with the thrust vector, of about 4882 kg/m$^2$ (1000 lbs/ft$^2$). Maximum pressure occurs on the bottom layer of the coiled fuel strip in an upright spool. Pressure on the bottom layer is a function of the instantaneous acceleration and the fraction of fuel remaining. That is, if 4882 kg/m$^2$ (1000 lbs/ft$^2$) is allowable, acceleration may be increased to maintain that pressure as the spool is depleted, in particular during the last 25–30 percent of the programmed burn.

TABLE II

| Outside Diameter | Wall Thickness cm | Segment Length | Average Weight kg/m length | Ideal Thrust kN/m length |
| --- | --- | --- | --- | --- |
| 2.0 | 0.068 | 6.0 | 0.22 | 22.1 |
| 4.0 | 0.136 | 12.0 | 0.87 | 88.4 |
| 6.0 | 0.204 | 18.0 | 1.97 | 198.9 |
| 8.0 | 0.272 | 24.0 | 3.50 | 353.6 |
| 10.0 | 0.340 | 30.0 | 5.47 | 552.5 |
| 12.0 | 0.408 | 36.0 | 7.87 | 795.6 |

Following the above example, similar tables can be constructed for other fuel materials. The ideal thrust values listed above are based on the fuel being consumed in an engine that is optimized for the specific fuel and combustion rate. That is, the rocket engine is configured to provide the most desirable pressure gradients and corresponding effective nozzle shape as possible for the application. Thus, with reference to the far right column in the above table, if it is desired to generate thrust at a rate of 200 kN/sec, the 4.0 cm diameter fuel strip would be consumed at a rate of 2.26 m/sec (200 kN/sec divided by 88.4 kN/m). Alternatively, if a lower feed rate of the fuel strip 10 is desired, the 6.0 cm diameter strip would be consumed at a rate of 1.01 m/sec.

Figure 3:
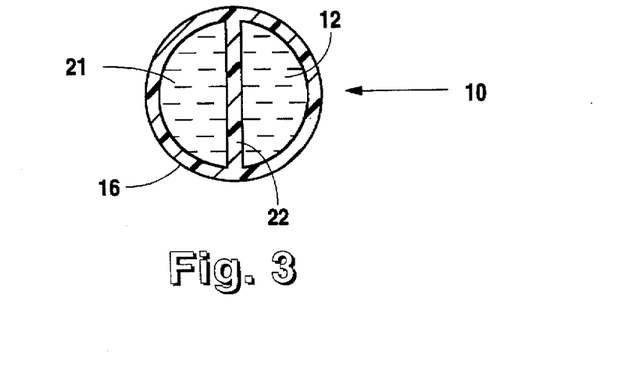
FIG. 3 is a cross-sectional view of another embodiment of a fuel strip embodying the present invention.

The relative length and cross-sectional width of the segments 14, and the length of the connecting links 20 may be varied to accomodate specific handling and fuel feed requirements, to adjust the oxidizer to fuel ratio and, as described above, can even be changed over the length of the strip to provide a variable ratio of fuel to oxygen within the fuel strip. Also, as shown in FIG. 3, two liquid components, for example a liquid fuel 21 such as kerosene, jet fuel, ethyl alcohol or hydrazine($N_2H_4$) may be selectively incorporated in the fuel strip 10 along with the liquid oxidizer 12 such as hydrogen peroxide or nitrogen tetroxide ($N_2O_4$), by providing an internal longitudinal wall 22, or partition. The wall 22 may be located off-center if unequal mounts of the liquid components are required.

In addition, the fuel strip 10 may be formed by extruding a solid fuel mixture of fuel and oxidizer components, either as a self supporting single structure or encased within a sheath such as the initial extruded tubular member 16 used for containment of the above described liquid components. The main ingredients of an extrudable solid fuel mixture preferably includes synthetic rubber, either as the primary fuel source or as a binder for other fuel or additives, and an oxidizer. For example, a suitable solid fuel mixture is described in U.S. Pat. No. 5,127,223, issued Jul. 7, 1992 to James Hightower, Jr., et al, and comprises, by weight percent, about 18% aluminum powder as a fuel, about 68% ammonium perchlorate as an oxidizer, which are bound together by a polybutadiene binder along with a burning rate catalyst respectively comprising about 10% and 4% of the propellant.

The solid fuel strip 10 is also easily shaped into a variety of cross-sectional shapes and external surface configurations. For example, the cross section of the solid fuel strip may have a star shape with 4, 5, 6 or more radially disposed arms. Such a shape offers more surface area which may be desirable, for certain fuels, to enhance combustion. Also, the outer surface of the fuel strip 10 may have a series of annular rings or fins forming radial projections that are angled away from the direction of feed of the strip whereby high pressure gases could at least assist in transport of the strip from its stored position and enhance delivery of the fuel strip 10 to the combustion zone. Positive differential gas pressure provided by any one of several conventional means, and the rocket engine could use different fuel strip 10 shapes and formulations during a single flight. For example, at liftoff and shortly thereafter the airspeed of the vehicle is zero or low. The section of the fuel strip 10 consumed during this initial flight stage could comprise fuel and oxidizer in a 7:1 ratio. As air pressure builds and ram air becomes available, atmospheric air may be used both for the positive gas pressure assist for fuel strip feed, and for a significant portion of the oxygen requirements to support fuel combustion. In this segment of the flight, the fuel strip 10 may have the above described annular rings formed on its outer surface, and comprise a fuel to oxidizer ratio of 1:2. Later in the flight, the content of the furl strip 10 would be the same as the initial portion, i.e., have a fuel to oxidizer ratio of 1:7, and an on board gas generator provide pressure to transport the fuel strip.

Additionally, metal powders such as aluminum, boron, lithium, beryllium and copper, or other particulate materials typically added to solid fuels to improve the reliability and sometimes increase the power of the mixture, can be intermixed with the fuel material forming the tubular fuel component 16 or with the solid materials forming a fuel strip 10 having a single unitary structure. The particulate materials may be homogeneously dispersed throughout the cross-section and length of the fuel strip 10, or may be variably distributed with a higher concentration of the additive material being concentrated at the outer surface, at the longitudinal center, or along predetermined portions of the length of the fuel strip 10.

The fuel strip 10 typically will have a length of over 300 m (984 ft) and a width, or diameter, normal to its length on the order of 4 to 12 cm (1.6 to 4.7 in). Thus, the fuel strip 10 has a very high length to width ratio, having a minimum value of at least 100:1 and a maximum value that may be significantly greater than 10,000:1. Also, as described below with reference to the use of multiple spools of fuel strips on a single vehicle, a plurality of fuel strips may be simultaneously fed to the rocket motor. In such applications, the fuel strips 10 may have differing compositions, for example one strip may primarily comprise a fuel mixture and another strip, or strips, provide the primary source of oxidizer.

The fuel strip 10 is self supporting of its own weight, and may be stored on a rocket vehicle in any convenient arrangement provided that the strip structure, as described in the above dimensional dam, provide sufficient support during acceleration and the imposition of dynamic pressure forces at lift-off and ascent. Preferably, the fuel strip 10 is wound in multi-layered coils 32 as shown schematically in FIG. 4. The fuel strip 10 is unwound from the coil 32 and fed into an engine 26 to provide propulsion. As the fuel strip 10 is depleted, that percentage of the vehicle GTOW is consumed. Thus, in effect a portion of the fuel "tankage" is continuously consumed thereby contributing to the aforementioned higher mass ratio. Importantly, after the fuel strip 10 is consumed, the remaining vehicle consists only of an aerodynamic shroud (if not discarded), the fuel strip feed mechanism, the engines and instrumentation, and payload.

Figure 4:
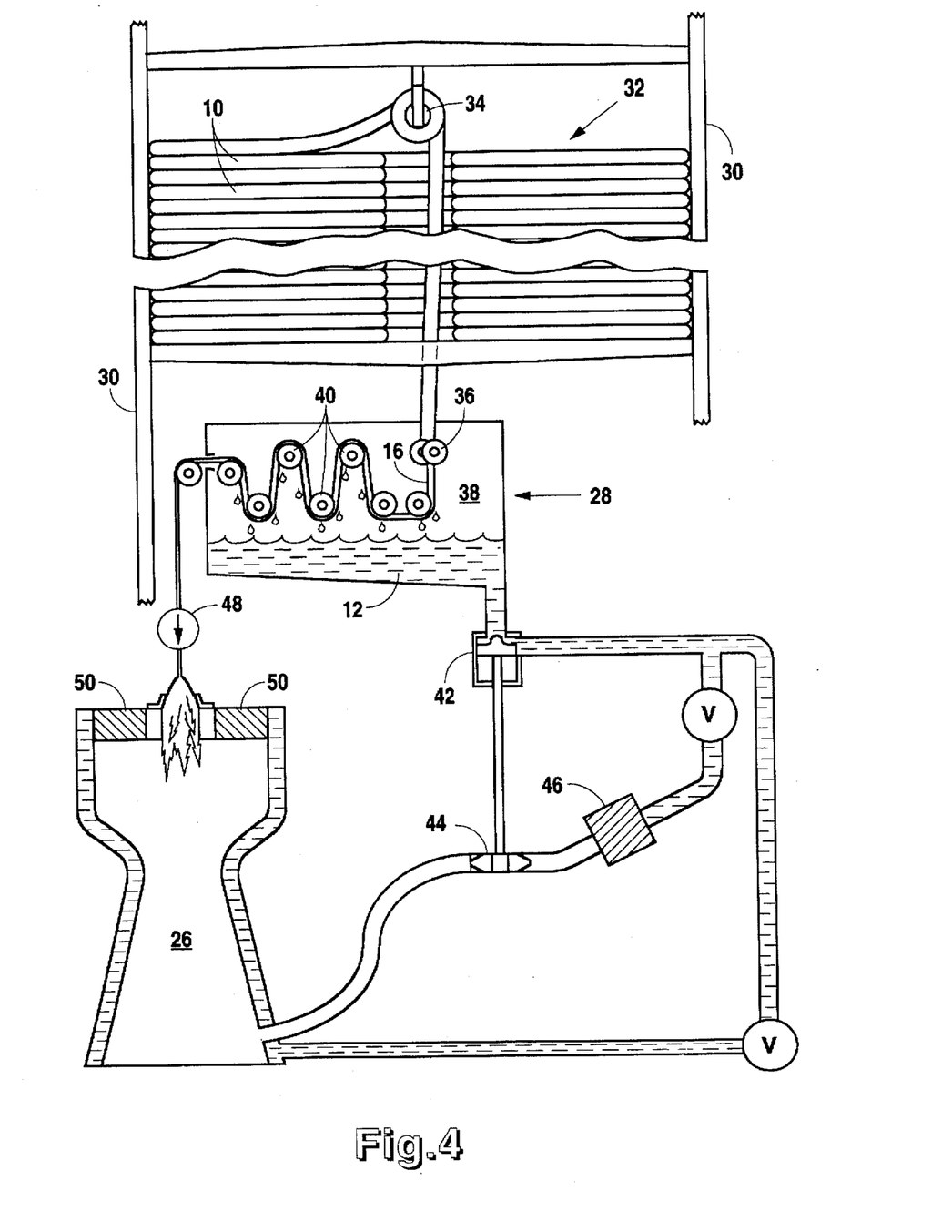
FIG. 4 is a schematic representation of a storage and delivery arrangement for feeding the fuel strip embodying the present invention to a rocket engine.

A fuel strip feed mechanism 28 is shown schematically in FIG. 4. In this illustrative example of the use of the above described preferred embodiment of the fuel strip 10, the fuel strip 10 is arranged in a stacked coil 32 within the flamework 30 of a rocket vehicle. The fuel strip 10 is drawn from the top of the coil 32 through a swiveled pulley 34, free to rotate around a vertical axis, by a plurality of coacting powered rollers 36. The powered rollers 36 also contain a plurality of sharp-edged blades that cut longitudinal slits through the walls of the segments 14 allowing the fluid $H_2O_2$ oxidizer 12 contained within the segments 14 to separate from the fuel component 16. Fluid separation is further enhanced in a separation zone 38 by passing the slit strip over a plurality of closely spaced rollers 40 which bend the strip through a series of sharply alternating reverse angles. One or more of the bend rollers 40 are preferably powered and rotate at a rate sufficient to maintain a light tension on the strip.

The separated hydrogen peroxide is directed away from the separation zone 38 by a pump 42 that is powered by a turbine 44. The turbine 44 is driven by a small portion of the hydrogen peroxide which is directed through a catalyst pack 46 whereat it is disassociated into gases having a temperature of about 1400° F. While not shown in the schematic diagram in the interest of simplicity, the catalyzed peroxide is also used to provide power to drive turbines connected with the rollers 36, 38, the fuel and oxidizer flow control valves, a fuel pump 48, and other elements of the fuel delivery system requiring a drive source. Propellant feed systems employing turbines driven by vaporized propellant are well known in the art, one of which is described in U.S. Pat. No. 3,613,375 titled ROCKET ENGINE PROPELLANT FEEDING AND CONTROL SYSTEM, issued Oct. 19, 1971 to Robert Abild. After passing through one or more of the drive turbines 44, the disassociated peroxide is directed to a low pressure zone of the rocket engine 26 whereat it serves as a monopropellant and arguably contributes a small amount of thrust. Optionally, the hot dissociated peroxide may be expanded to a temperature of about 250° F. and at least partially melt the fuel component 16 of the fuel strip 10 prior to the fuel being injected into the combustion chamber of the engine 26 by the fuel pump 48. In this arrangement, the injection pump 42 would inject a highly viscous fuel into the engine combustion chamber. Although it is believed that the slit strip would, or could be made so that it would, combust at a sufficiently rapid rate when fed as a continuous solid strip into the combustion chamber, the strip may alternatively be comminuted into small particles prior to injection.

The major portion of the separated peroxide is circulated around the engine to provide conventional regenerative cooling of the engine case before being directed through a annular catalyst pack 50 surrounding the fuel injection port of the engine 26. The annular catalyst pack 50 is preferably silver gauze and provides a surface area sufficient to accommodate a peroxide flow rate of about 0.4 lbs/sec/in² of surface of the pack 50. The surfaces of the polyethylene fuel material, surrounded by free oxygen from the disassociated peroxide at the injection zone of the engine 26 will burn in a direction normal to the surface at a rate dependant on chamber pressure and propellant temperature.

At start-up, a preformed leader of the fuel strip 10 is fed through the swivel pulley 34, the drive/slitter rollers 36, and the bend rollers 40. If desired, the bend rollers 40 may be provided with a plurality of guides whereby the leading end of the fuel strip 10 is self-directed through the bend rollers 40 after being manually fed through the drive/slitter rollers 36. An external hydrogen peroxide supply is connected by a disconnectable hose to the gas generator catalyst packs, for example pack 46, which starts the turbine 44. Power is then available to feed the fuel through the feed mechanism 28, the fuel injection pump 48, and the oxidizer pump 42. Externally supplied peroxide is also directed through the coolant passages surrounding the engine 26 to the primary catalyst pack 50 whereupon it is heated to 1400° F. and injected around the fuel delivered by the injection pump 48. Upon contact with the disassociated peroxide, the fuel material spontaneously ignites. After start-up, the external peroxide supply is disconnected, and the fuel strip 10 may be fed at a low rate sufficient to establish stabile combustion, after which the feed rate can be increased to a higher rate to develop lift off thrust.

Other storage arrangements and separation methods may be used, depending upon the particular fuel and oxidizer materials selected for the fuel strip 10. For example, a solid fuel may be combined with a solid oxidizer in a grain matrix similar to that used in a solid fuel rocket. This may be extruded into a fuel strip which is injected directly into the combustion chamber of a rocket engine. This embodiment would not require separation of liquid and solid components prior to injection into the engine.

Figure 5:
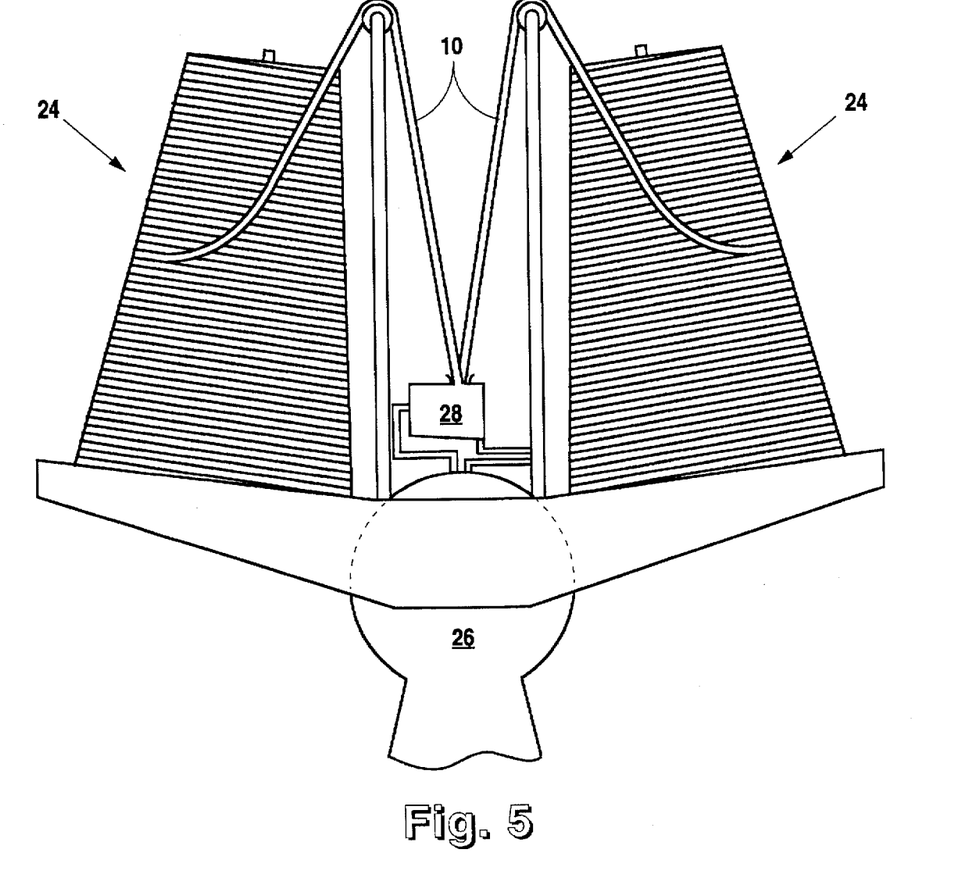
FIG. 5 is a schematic representation of a storage arrangement for a plurality of spooled fuel strips embodying the present invention.
Figure 6:
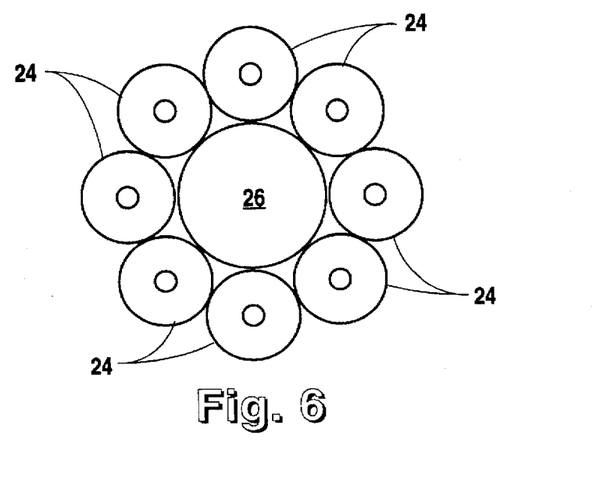
FIG. 6 is a schematic representation illustrating the respective spatial arrangement of a plurality of spooled fuel strips embodying the present invention.

It may be desirable to store the fuel strip 10 in multiple spool arrangements as shown in FIGS. 5 and 6. Arrangement in multiple pairs allows release, or ejection, of a pair spools in case of feed malfunction. This capability would provide safe mission abort or continuation options. During vehicle ascent, an inoperative spool would result in an unbalanced load, causing a cumulative lateral shift of the vehicle's center of gravity. As the center of gravity diverged from the centerline trust, flight would become increasing unstable. If the fuel is stored on the vehicle in multiple spools arranged in pairs that are symmetrically balanced, a symmetrical pair of spools could be ejected, and unbalanced load carried by the vehicle corrected, and the flight continued, perhaps with an alternative mission or purpose. Furthermore, a single reusable rocket vehicle may also have multiple mission capability requiting 2, 4, 6 or 8 spools of the fuel strip 10 having a standard configuration. Such an arrangement would be similar to rocket systems (Russia's Energia, for example) that have a central core rocket with one, two or three pairs of booster stages arranged symmetrically around the core rocket.

Spools of the fuel strip 10 having a standard, or common, specifications, could advantageously be mass produced. In addition, such standardized spools could be provided in sizes and weights that are readily transportable on existing truck and rail transportation systems. Furthermore, spools of the fuel strip 10 containing hydrogen peroxide may be safely transported by submergence in water during transport, in which case the spools would be less hazardous to move than existing methods of transporting jet fuel, liquid hydrogen, or liquid oxygen.

By way of example, a practical "standardized" spool 24 may be constructed according to the following dimensions and parameters:

TABLE III

| | |
|---|---|
| Spool diameter at base | 2.44 m (8.0 ft) |
| Spool diameter at top | 2.14 m (7.0 ft) |
| Spool height | 4.88 m (16.0 ft) |
| Inside diameter of coiled strip | 0.46 m (1.5 ft) |
| Theoretical volumetric capacity | 19.25 m³ (679.6 ft³) |
| Volume reduction for voids | 10% |
| Weight of spool | 13872.7 kg (30,583.5 lbs) |

At a specific impulse of 320 seconds, the above spool 24 will provide a mass ratio of 18.7. This results in 742 kg (1635 lbs) to LEO. Subtracting 160 kg (350 lbs) for the weight of spool supports and feed mechanisms, results in a payload capacity equal to 4.2%, or 583 kg (1285 lbs) of the spool weight to LEO. Carrying this example further, if it is assumed that the weight of the engine, pumps and other vehicle structure is 1814 kg (4,000 lbs), a reusable single stage vehicle with four of the above standard spools could propel a net payload of 517 kg (1,140 lbs) to low earth orbit (4×583 kg less the vehicle weight of 1814 kg). In like manner, the same vehicle equipped with six of the above spools could place 1683 kg (3,710 lbs) in LEO, and with eight spools the vehicle could place 2849 kg (6280 lbs) in low earth orbit.

Figure 7:
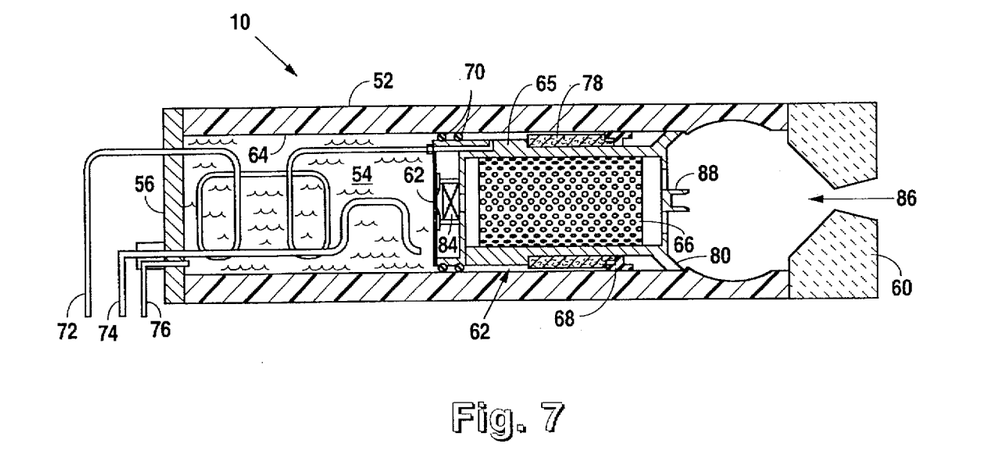
FIG. 7 is a longitudinal sectional view of another embodiment of the fuel strip embodying the present invention showing a fixed arrangement of the fuel strip with respect to an engine nozzle; and, FIG. 8 is a longitudinal sectional view of the fuel strip shown in FIG. 7, showing a moveable arrangement of the fuel strip with respect to an engine nozzle.
Figure 8:
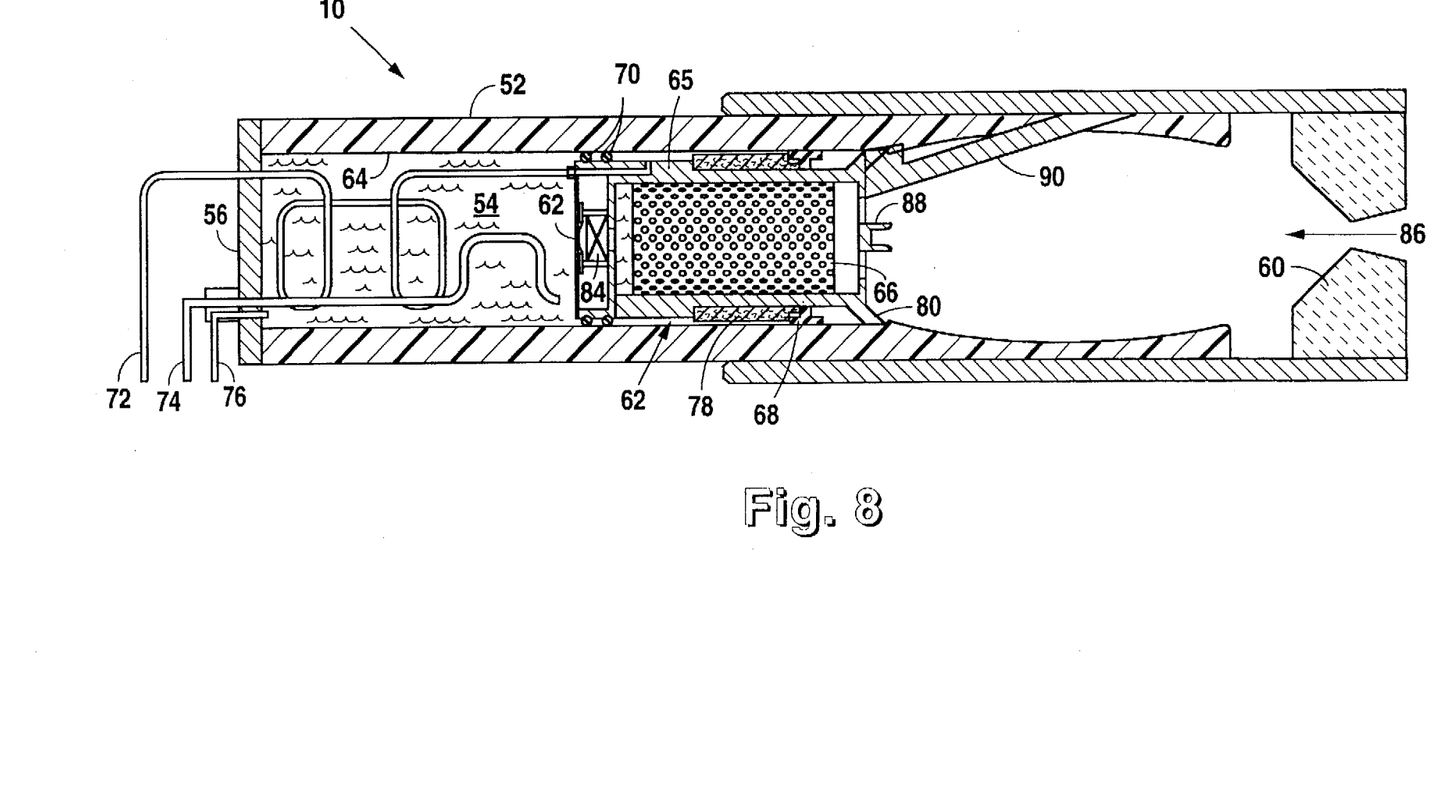

As shown in FIGS. 7 and 8, the fuel strip 10 embodying the present invention may also comprise a continuous, elongated, substantially rigid combustible structural component 52 and a liquid oxidizer 54 contained within the structural component 52 in an amount sufficient to support the combustion of a predetermined portion of the combustible structural component 52. In this embodiment, an end wall 56, or bulkhead, provides a closure over a forward end of the fuel strip 10 and is preferably formed of a relatively lightweight metal such as aluminum. The combustible structural component 52 is preferably formed of a combustible plastic material such as ultra-high molecular weight (UHMW) polyethylene. For example, SPECTRA, an extended chain polyethylene fiber produced by Allied Signal, may be advantageously formed into a laminated composite structure having high rigidity and structural strength. Hydrogen peroxide having a concentration of at least about 70% is the preferred liquid oxidizer 54.

The substantially rigid combustible structural component 52 may be fixed with respect the a nozzle 60, as illustrated in FIG. 7, or moveable with respect to the nozzle 60, as shown in FIG. 8. In both arrangements, a catalyst pack 62, adapted for relative movement in a longitudinal direction with respect to the combustible case 52, is disposed inside the case 52 in intimate contact with an internal surface, or bore, 64 of the combustible case 52. Thus, it can be seen that the combustible structural component 52 is essentially an elongated tube having a first end adjacent the nozzle 60 and a second end adjacent the end wall 56. The internal bore 64 of the combustible case 52, and the end wall 56, and the catalyst pack 62 thus cooperate to define an interior chamber for storage of the liquid oxidizer 54.

The catalyst pack 62 includes a stainless steel tube 65 filled with a catalyst 66, for example silver gauze, for the liquid oxidizer 54. An annular T-seal 68 disposed at a rearward, or discharge, end provides a seal between the catalyst pack 62 and the interior wall 64 of the combustible case 52, and a pair of annular O-rings 70 disposed at the forward, or inlet, end of the catalyst pack 62 forms a seal at the forward end of the catalyst pack 62. A relatively small vent line 72 is provided behind the O-ring seals 70 to allow any oxidizer 54 that may seep past the O-rings 70 to be released to the exterior of the combustible case 52 as it vaporizes.

An oxidizer fill line 74 and an oxidizer overflow vent line 76 extend respectively through the end wall 56 to provide for filling the internal chamber in the case 52 with the liquid oxidizer 54. Also, insulation 78 is provided around the exterior surface of the catalyst pack 62 to moderate heat transfer resulting from the catalytic reaction between the catalyst 66 and oxidizer 54. Hydrogen peroxide, having a 90% concentration, dissociates at a temperature of 1364° F. (740° C.) in the presence of a silver catalyst. The insulation 78 thus prevents premature melting of the combustible case 52. During a burn, temperatures increases rapidly rearwardly of the T-seals 68 and viscous flow at the interior surface 64 of the case 52 occurs, providing a seal at a bite edge 80 provided at the rearward end of the catalyst pack 62.

A thin membrane diaphragm seal 82 is disposed at the forward end of the catalyst pack to prevent premature entry of the liquid oxidizer 54 into the catalyst medium 66. In addition, a one-way flow control valve 84 is desirably disposed between the diaphragm seal 82 and the catalyst 66 to assure only positive oxidizer flow into the catalyst pack 62.

A combustion chamber 86, is defined at its discharge end by the nozzle 60 attached to the distal end of the combustible case 52, around its periphery by the internal bore 64 of the combustible case 52 which is largely, but not completely consumed during combustion, and at its intake end by the rearward end and the bite edge 80 of the catalyst pack 62. Combustion is desirably initialed by ignition of a small pyrotechnic charge placed in a combustible holder 88 positioned in the combustion chamber 86 at a position near the rearward end of the catalyst pack 62.

Upon ignition of the pyrotechnic charge, the catalyst pack 62 is forced toward the end wall 56 with sufficient force to rupture the thin membrane diaphragm seal 82 between the liquid catalyst 54 and the catalyst medium 66, thereby initiating a flow of liquid oxidizer 54 into the catalyst 66 and a flow of gaseous oxygen into the combustion chamber 86. The oxygen provides for the combustion of the combustible case 52 which burns from the inside surface 64 toward the outer surface. Pressure generated in the combustion chamber 86 not only provides thrust but also creates a pressure urging the catalyst pack 62 toward the end wall 56, thus forcing a positive pressure flow of oxidizer 54 through the catalyst 66.

As liquid oxidizer 54 is consumed, the catalyst pack 62 continues to move toward the end wall 56 thus expanding the length of the combustion chamber 86 while simultaneously decreasing the volume of oxidizer 54 stored within the combustible case 52. The rate of travel of the catalyst pack 62 with respect to the combustible case 52 is largely determined by the pressure produced in the combustion chamber 86 and the liquid oxidizer 54 flow rate permitted by the flow control valve 84. The flow control valve 84 is therefore sized to permit a flow of liquid oxidizer 54 through the catalyst pack 62 at a rate to provide significant, but not complete combustion of the combustible case 52. Importantly, it is necessary that the rate of movement of the catalyst pack 62 be sufficient to prevent burn-thru of the combustible case 52. Thus, it can be readily understood that, in this embodiment, the fuel strip 10 is specifically adapted for use in rockets having a relatively short burn.

During a motor burn sequence, as noted above, the combustion chamber volume increases as a result of movement of the catalyst pack 62 away from the nozzle 60 and combustion of the internal portion of the combustible case 52. The flow control valve 84 may comprise a simple check valve and a controllably variable orifice to regulate the rate of liquid oxidizer flow. In such an arrangement, control wires may be routed through the oxidizer-filled interior chamber of the fuel strip 10.

Alternatively, as shown in FIG. 8, the catalyst pack 62 may be fixed with respect to the nozzle 60, and the combustible case 52 mechanically moved, or fed, into the combustion chamber 86 during a burn. In this motor arrangement, the catalyst pack 62 is supported by support arms 90 extending inwardly from an outer housing 92 also connected to the nozzle 60. Thus, in this arrangement, the combustion chamber volume is constant and the combustible surface area presented by the inserted combustible case 52 is approximately the same over the course of the burn.

The support arms 90 are desirably positioned so that they are protected from the approximately 5,000° F. combustion temperatures typically generated in the central region of the combustion chamber 86 during a burn. As described above, the discharge temperature of decomposed 90% hydrogen peroxide from the catalyst 66 is on the order of 1364° F. (740° C.), well below the melting rate of high-service temperature metallic materials, and is desirably directed around the outer surface of the struts 90. Also, it should be noted that, in the presence of higher ambient temperature, the combustible case 52, particularly if formed of polyethylene, is considerably softened and has the consistency of a viscous mass prior to contact with the catalyst pack support struts 90.

If desired, a portion of the oxidizer output from the catalyst pack 62 may be directed through a passageway provided in one of the support struts 90 to a turbine and thereby provide the motive force for moving the fuel strip 10 towards the nozzle 60.

If desired, a portion of the oxidizer output from the catalyst pack 62 may be directed through a passageway provided in one of the support struts 90 to a turbine and thereby provide the motive force for moving the fuel strip 10 towards the nozzle 60.

Thus, it can be seen that in this embodiment of the fuel strip 10, the combustible case 52 comprises a single, continuous, relatively rigid member having a liquid oxidizer 54 internally disposed within the combustible case 52. The thickness of the combustible case 52 must be sufficient to prevent burn-thru at a predetermined combustion rate and, therefore, the fuel strip 10 should provide a mass ratio of fuel to oxidizer of at least the aforementioned 1:7 ratio for polyethylene fuel and hydrogen peroxide oxidizer source. In the fixed-tube arrangement, it is desirable that the fuel to oxidizer ratio be somewhat greater to assure a remainder of uncombusted case structure. Accordingly, in the above arrangement, the fuel strip 10 may have a length to diameter ratio that is significantly less than the earlier described embodiments, for example on the order of only about 10:1 or even 5:1.

INDUSTRIAL APPLICABILITY

As can be readily seen from the above example, the fuel strip 10 embodying the present invention has significant application in rocket applications, whether they be suborbital missiles or space vehicles. By reducing the weight of the nonconsumable structure of a rocket, the Mass Ratio of the vehicle is dramatically increased. Also, the fuel strip 10 enables the combining of solid fuel and liquid oxidizer, or solid oxidizer and liquid fuels, in a manner that has not been heretofore practical. In addition, the present invention allows easy incorporation of a wide selection of additives into the fuel strip 10.

When provided on prewound spools, the fuel strip 10 embodying the present invention is easily transportable and readily storable in preselectively sized units, either at a fuel depot or on board a vehicle.

Although the present invention is applicable to multistage vehicle applications, the reduced nonconsumable structure requirements now possible obviates the need for many two and three stage vehicles. Multiple staged vehicles are very costly due, at least in part, to their complexity and multiplicity of potential failure modes.

Importantly, the fuel strip 10 embodying the present invention is useful in other than rocket engine propulsion applications. For example, it is often necessary to provide a controlled environment void of nitrogen and other atmospheric gases for heat treatment of metallic and certain composite materials. In such applications, the fuel strip 10 can be constructed to include only those materials that, upon combustion, produce the desired atmosphere.

Other aspects, features and advantages of the present invention can be obtained from a study of this disclosure together with the appended claims.

What I claim is:

1. A fuel member comprising a continuous, elongated, flexible and combustible structural component having a longitudinal axis extending along its length, a predetermined width normal to said longitudinal axis, and a length to diameter ratio of at least 100:1, and an oxidizer present in the fuel member in an amount sufficient to solely support the complete combustion of said fuel member.

2. A fuel member, as set forth in claim 1, wherein said structural component has a tubular wall structure defining at least one internal cavity, and said fuel member includes a second component disposed in said internal cavity.

3. A fuel member, as set forth in claim 2, wherein the second component of the fuel member, disposed in the internal cavity, is said oxidizer.

4. A fuel member, as set forth in claim 3, wherein said oxidizer is hydrogen peroxide.

5. A fuel member, as set forth in claim 4, wherein the structural component is formed of polyethylene.

6. A fuel member, as set forth in claim 5, wherein the structural component further includes a particulate fuel material combined within said polyethylene.

7. A fuel member, as set forth in claim 1, wherein said structural component is a substantially homogeneous, unitary structure comprising a solid mixture of fuel and said oxidizer.

8. A fuel member, as set forth in claim 7, wherein the fuel component of said mixture includes a synthetic rubber material.

9. A fuel member, as set forth in claim 8, wherein said oxidizer is ammonium perchlorate.

10. A fuel member, as set forth in claim 1, wherein said structural component is a nonhomogeneous, unitary structure comprising a solid mixture of fuel and said oxidizer.

11. A fuel member, as set forth in claim 1, wherein said structural component consists essentially of a solid material encased in a flexible, combustible sheath, said solid material comprising a mixture of a fuel and said oxidizer.

12. A fuel member, as set forth in claim 11, wherein said fuel component is a hydrocarbon fuel and said oxidizer component is hydrogen peroxide.

13. A fuel member, as set forth in claim 1, wherein said structural component is a tubular wall structure having at least two separate, non-communicating, internal cavities, at least one of said cavities having a fuel component disposed therein and at least another one of said cavities having said oxidizer disposed therein.

14. A fuel system comprising a plurality of fuel members each having a continuous, elongated, flexible and combustible structural component that has a predetermined length and width, and a length to width ratio of at least 100:1, and an oxidizer disposed in at least one of said plurality of fuel members in an amount sufficient to solely support the complete combustion of all of said fuel members comprising said fuel system.

15. A fuel system, as set forth in claim 14, wherein each one of said plurality of fuel members contains an oxidizer.

16. A fuel member comprising a continuous, elongated, substantially rigid, combustible structural component having an internal bore partially defining a combustion chamber, and a liquid oxidizer disposed within at least a portion of the combustible structural component in an amount sufficient to support the combustion of a predetermined portion of the combustible structural component.

17. A fuel member, as set forth in claim 16, wherein said combustible structural component has an internal bore partially defining an internal chamber for storage of said liquid oxidizer.

18. A fuel member, as set forth in claim 16, wherein said combustible structural component of the fuel member is formed of polyethylene and said liquid oxidizer is hydrogen peroxide.

* * * * *